(12) United States Patent
Mathai et al.

(10) Patent No.: US 9,062,354 B2
(45) Date of Patent: Jun. 23, 2015

(54) SURFACE TREATMENT SYSTEM, A SURFACE TREATMENT PROCESS AND A SYSTEM TREATED COMPONENT

(75) Inventors: Manu Mathai, Chennai (IN); Andrew Batton Witney, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 297 days.

(21) Appl. No.: 13/033,771

(22) Filed: Feb. 24, 2011

(65) Prior Publication Data

US 2012/0217235 A1   Aug. 30, 2012

(51) Int. Cl.
| | |
|---|---|
| H05B 6/10 | (2006.01) |
| H05B 6/62 | (2006.01) |
| C21D 1/10 | (2006.01) |
| B05B 13/04 | (2006.01) |
| B05B 13/06 | (2006.01) |
| C21D 1/667 | (2006.01) |
| C21D 7/06 | (2006.01) |
| C21D 9/00 | (2006.01) |
| H05B 6/42 | (2006.01) |

(52) U.S. Cl.
CPC .............. *C21D 1/10* (2013.01); *B05B 13/0436* (2013.01); *B05B 13/06* (2013.01); *C21D 1/667* (2013.01); *C21D 7/06* (2013.01); *C21D 9/0068* (2013.01); *C21D 2221/00* (2013.01); *H05B 6/101* (2013.01); *H05B 6/42* (2013.01)

(58) Field of Classification Search
CPC .............. H05B 6/10; H05B 6/36; H05B 6/42; H05B 6/62; H05B 6/14
USPC ............... 219/600, 121.61, 121.84, 602, 632, 219/628, 629, 630, 643, 674, 677; 451/39, 451/139, 40; 72/53; 134/10, 30; 376/249, 376/260, 305, 316; 239/102.2, 102.3
See application file for complete search history.

(56) References Cited

U.S. PATENT DOCUMENTS

| | | | |
|---|---|---|---|
| 2,853,410 A | | 9/1958 | Lula |
| 3,389,991 A | | 6/1968 | Tanczyn |
| 3,535,481 A | | 10/1970 | Korb |
| 3,554,514 A | * | 1/1971 | Preyer .......................... 266/129 |
| 3,652,346 A | * | 3/1972 | Tomita et al. ................. 148/569 |
| 3,730,785 A | | 5/1973 | Conrad, Sr. et al. |
| 4,058,417 A | | 11/1977 | Bicicchi et al. |
| 4,459,454 A | * | 7/1984 | Inoue .......................... 219/69.14 |
| 4,699,671 A | | 10/1987 | Jacobs et al. |
| 4,786,772 A | * | 11/1988 | Umemoto et al. ............ 219/643 |
| 4,842,655 A | | 6/1989 | Porowski et al. |
| 4,855,556 A | * | 8/1989 | Mucha et al. ................. 219/640 |

(Continued)

FOREIGN PATENT DOCUMENTS

| | | |
|---|---|---|
| EP | 2492360 A3 | 8/2013 |
| FR | 2816323 A1 | 5/2002 |

(Continued)

*Primary Examiner* — Dana Ross
*Assistant Examiner* — Michael Laflame, Jr.
(74) *Attorney, Agent, or Firm* — McNees Wallace & Nurick LLC

(57) ABSTRACT

A system, process, and component are disclosed. The system and process involve an induction heater arranged and disposed to heat a component to form a heated surface and a nozzle arrangement positioned to apply a fluid to the heated surface to form a processed surface of a component. The processed surface includes compressive residual stress resulting in increased resistance to fatigue, including fretting fatigue, for the component.

19 Claims, 5 Drawing Sheets

(56) References Cited

U.S. PATENT DOCUMENTS

| | | | |
|---|---|---|---|
| 5,234,201 A * | 8/1993 | Chatterjee et al. | 266/129 |
| 5,414,246 A * | 5/1995 | Shapona | 219/640 |
| 5,778,713 A | 7/1998 | Butler et al. | |
| 6,135,857 A | 10/2000 | Shaw et al. | |
| 6,143,241 A | 11/2000 | Hajaligol et al. | |
| 6,344,098 B1 | 2/2002 | Manning et al. | |
| 6,868,790 B1 * | 3/2005 | Gieseke et al. | 102/367 |
| 6,955,754 B2 * | 10/2005 | de Sylva | 210/120 |
| 7,459,037 B2 | 12/2008 | Monaka et al. | |
| 7,716,961 B2 * | 5/2010 | Hatou et al. | 72/53 |
| 2005/0009447 A1 * | 1/2005 | van Brug | 451/5 |
| 2005/0103362 A1 * | 5/2005 | Soyama | 134/34 |
| 2007/0138166 A1 * | 6/2007 | Fennewald et al. | 219/542 |
| 2008/0277383 A1 * | 11/2008 | Sandlin et al. | 219/69.12 |
| 2009/0031873 A1 * | 2/2009 | Gieseke | 83/177 |
| 2009/0158591 A1 | 6/2009 | Huff et al. | |
| 2009/0162271 A1 * | 6/2009 | Holloway et al. | 423/580.1 |
| 2009/0188157 A1 * | 7/2009 | Holloway et al. | 44/301 |
| 2009/0312956 A1 | 12/2009 | Zombo et al. | |
| 2010/0116383 A1 | 5/2010 | Cloue et al. | |
| 2012/0200205 A1 | 8/2012 | Witney | |

FOREIGN PATENT DOCUMENTS

| | | |
|---|---|---|
| JP | 051148611 | 12/1976 |
| JP | 59153451 | 9/1984 |
| JP | 01312028 | 12/1989 |
| JP | 11279635 A | 10/1999 |
| JP | 2002012916 | 1/2002 |

* cited by examiner

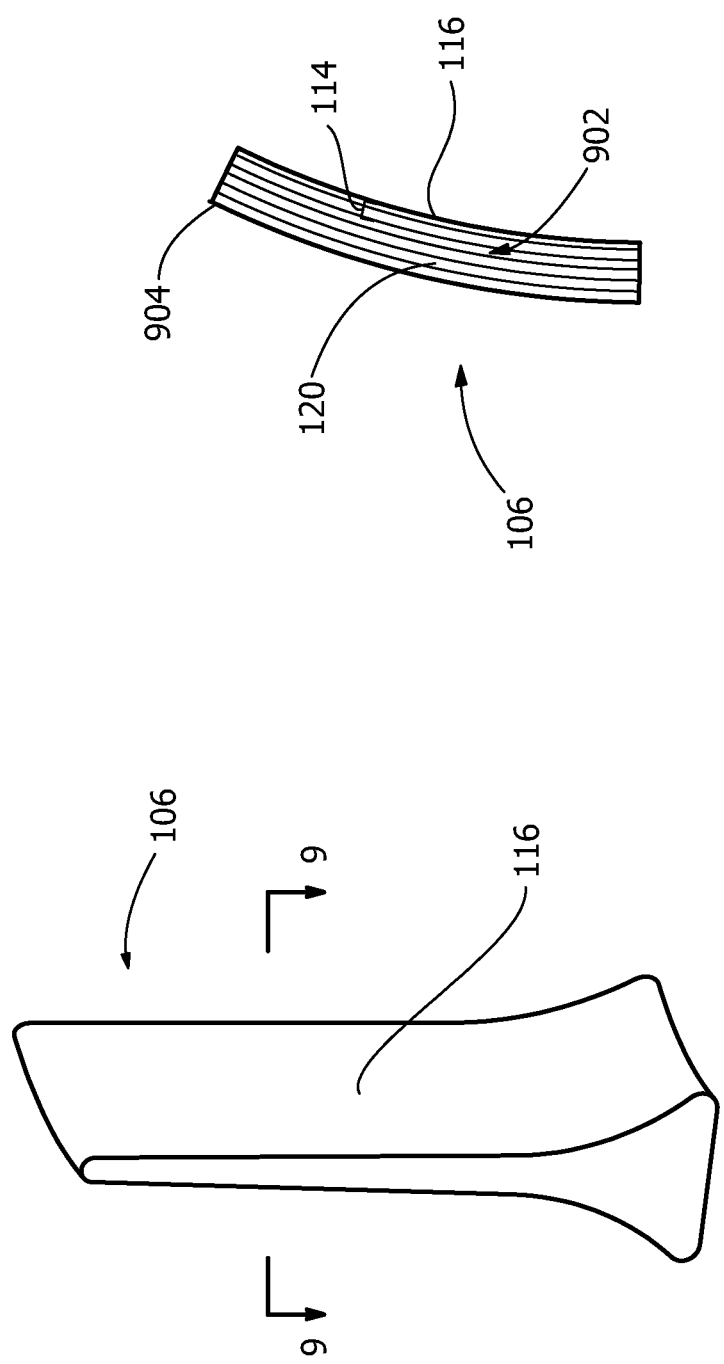

SURFACE TREATMENT SYSTEM, A SURFACE TREATMENT PROCESS AND A SYSTEM TREATED COMPONENT

FIELD OF THE INVENTION

The present invention is directed to systems and methods of manufacturing and treating metal components. More specifically, the present invention is directed to systems and methods of inductively heating and applying fluid to metal components.

BACKGROUND OF THE INVENTION

Metal components, such as compressor blade dovetails of gas turbines, are prone to failure by both fatigue and fretting fatigue. Fatigue can be described as the process by which cyclic loads below a material's tensile strength initiate and propagate surface cracks. Fretting fatigue can be described as a specific form of fatigue in which small amplitude sliding motion, for example, between about 50 and about 200 micrometers, initiates and propagates cracks. The sliding motion can exacerbate the usual fatigue process through production of abrasive, oxidized wear product. Fretting fatigue can occur in components such as aerofoil dovetails and/or the attachment points in gas or steam turbine rotors. Both ordinary and fretting fatigue cracks are surface-initiated microcracks that propagate to the interior of the component. When components have high temperature gradients with the surface being at a greater temperature than the interior portions, fretting fatigue cracks are more likely to be formed. Compressive residual stress proximal to the surface of the components reduces the likelihood that both fatigue and fretting fatigue cracks will form.

In a known system, laser shock processing can be used to improve the fretting fatigue resistance by increasing compressive residual stress at the surface of a component. Using laser shock processing suffers from several drawbacks. For example, laser shock processing can damage components such as blade dovetails due to high intensity shock waves generated. The shock waves reflect on surfaces of the base material generating a tensile stress. The tensile stress can propagate existing flaws and cracks leading to failure of the base material. In addition, laser shock processing adds undesirable costs.

In another known system, a coating is applied to a compressor blade dovetail to improve the fretting fatigue resistance. Application of the coating suffers from several drawbacks. For example, application of the coating Alumazite can have a premature failure due to the tensile nature of stress at an interface between the coating and a base material (for example, a martensitic stainless steel such as an alloy including about 15.5% chromium, about 6.3% nickel, about 0.8% molybdenum, about 0.03% carbon, and a balance of iron). This can result in propagation of cracks into the base material when the coating spalls off cracks. This can reduce the corrosion resistance of the base material and permit crevice corrosion of the base material. In addition, the coating can result in additional undesirable costs.

In another known system, water jet impact is used to treat a component. The water jet impact removes debris and cleans the surface of the component. Water jet impact suffers from several drawbacks. For example, water jet impact does not improve fretting fatigue resistance and water jet impact does not increase the compressive residual stress near the surface of the component.

A system and method capable of improving the fretting fatigue resistance of a component that does not suffer from the above drawbacks would be desirable in the art.

BRIEF DESCRIPTION OF THE INVENTION

According to an embodiment, a surface treatment system includes an induction heater arranged and disposed to heat a component to form a heated surface while in an induction treatment mode, a nozzle arrangement positioned to apply a fluid to the heated surface of the component at a pressure above a cavitation pressure of the fluid to form a processed surface while in a fluid application mode. The processed surface includes compressive residual stress.

According to another embodiment, a surface treatment process includes inductively heating a component by an induction heater thereby forming a heated surface and applying a fluid by a nozzle arrangement to the heated surface at a pressure above a cavitation pressure of the fluid thereby forming a processed surface. The processed surface includes compressive residual stress.

According to another embodiment, a surface treated component includes a processed surface including compressive residual stress formed by being inductively heated to form a heated surface and applying a fluid to the heated surface. The processed surface includes resistance to fretting fatigue greater than an interior portion of the component or untreated surfaces.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 8 shows a perspective view of an embodiment of an exemplary surface treated component according to the disclosure.

FIG. 9 shows a sectioned view along line 9-9 of the exemplary surface treated component in FIG. 8.

DETAILED DESCRIPTION OF THE INVENTION

Provided is a surface treatment system and surface treatment process capable of improving the fretting fatigue resistance of a metal component. The system and method increase compressive residual stress thereby improving fretting fatigue resistance. Embodiments of the present disclosure permit automation of inductive heating and water jet peening, increase the useful life of induction heaters, generate compressive residual stress proximal to a surface of the component, reduce or eliminate cracks or propagation of cracks below a surface of the component, and combinations thereof.

According to the present disclosure, both "fatigue" and "fretting fatigue" are less likely. Therefore, as used hereinafter, the terms "fatigue" and "fretting fatigue" are used interchangeably in the context of the present disclosure.

Figure 1:
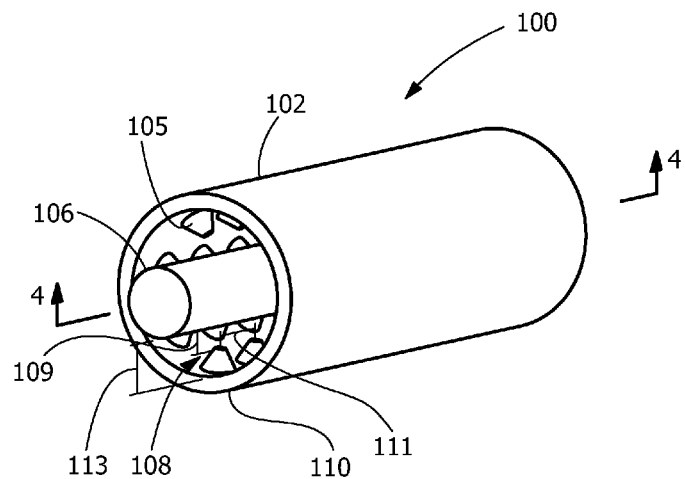
FIG. 1 shows a perspective view of an embodiment of an exemplary surface treatment system according to the disclosure.
Figure 2:
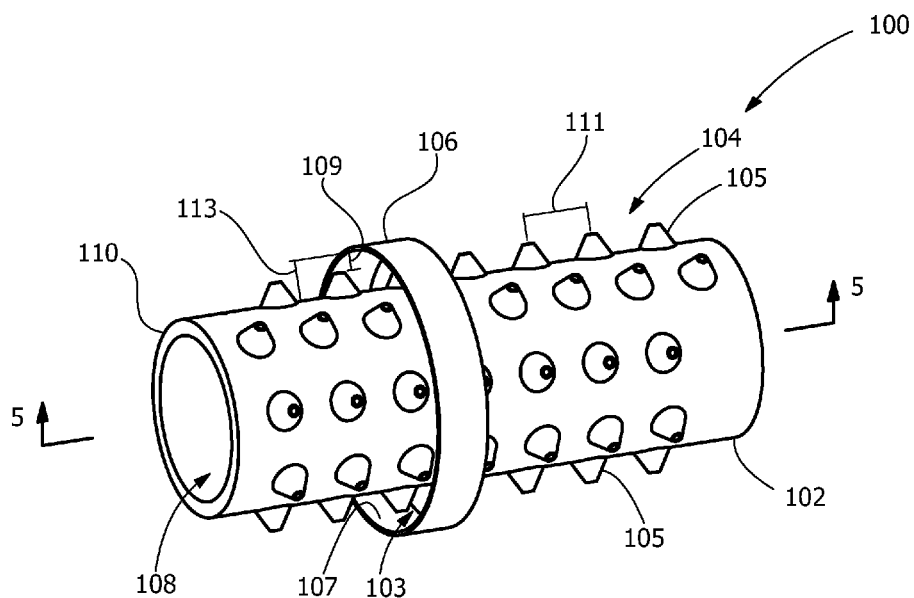
FIG. 2 shows a perspective view of an embodiment of an exemplary surface treatment system according to the disclosure.

Referring to FIGS. 1-2, a system 100 includes an induction heater 102 and a nozzle arrangement 104. The system 100 is configured to inductively heat a metal component 106. The metal component 106 includes any suitable metal or metallic composition. For example, in various embodiments, the metal component 106 includes an alloy of any type, including, but not limited to, austenitic steel, steel/nickel alloys, martensitic/bainitic stainless steels, etc. In one embodiment, the component 106 includes an alloy of martensitic/bainitic stainless steel having by weight chromium of less than about 15%, nickel of less than about 5%, manganese of less than about 2%, and molybdenum of less than about 3%. In one embodiment, the component 106 is secured by hardware (not shown) to restrain movement of the component 106 during induction treatment mode and/or fluid application mode.

During an induction heating mode, the component 106 is heated by the induction heater 102 forming a heated surface (described below with reference to FIG. 9). Referring to FIG. 1, in one embodiment, the component 106 is heated in a chamber 108 of the induction heater 102. In one embodiment, the induction heater 102 is positionable by positioning hardware (not shown) and/or positioning equipment (not shown). In one embodiment, the chamber 108 is generally cylindrical and formed by the induction heater 102 and the nozzle arrangement 104 being positioned in a coaxial relationship or a unitary relationship. In this embodiment, the component 106 or a portion of the component 106 is positionable within the chamber 108 and/or the system 100 is positionable around or proximal to the component 106 or a portion of the component 106.

In another embodiment, referring to FIG. 2, the component 106 is heated by being proximal to the induction heater 102 (for example, being positioned adjacent to the induction heater 102 or being within an external circumferential region 103 proximal to the induction heater 102). In this embodiment, an interior surface 107 of the component 106 is heated by the induction heater 102. In one embodiment, the heated surface is then cooled or allowed to cool.

Referring to FIGS. 1-2, the nozzle arrangement 104 is configured to apply a fluid to the component 106 or a portion of the component 106 during a fluid application mode. Similar to the induction heater 102, in one embodiment, the nozzle arrangement 104 is capable of applying the fluid to the component 106 or a portion of the component 106 within the chamber 108. In one embodiment, the nozzle arrangement 104 is positionable by positioning hardware (not shown) and/or positioning equipment (not shown). In one embodiment, the nozzle arrangement 104 is capable of applying the fluid to the component 106 or a portion of the component 106 proximal to the nozzle arrangement 104 (for example, being positioned proximal to the nozzle arrangement 104 or being positioned within the external circumferential region 103 proximal to the nozzle arrangement 104) as shown in FIG. 2.

In one embodiment, the nozzle arrangement 104 includes one or more nozzles 105 (suitable nozzles include ultra-high pressure water jet nozzle for water jet peening or any other nozzle operable within the nozzle arrangement 104). The nozzle arrangement 104 applies the fluid to the metal component 106. In one embodiment, nozzle parameters are adjustable and coordinated through use of a control program (not shown) operable in conjunction with any suitable computer. In one embodiment, one or more of the nozzles 105 are configured to operate at a predetermined pressure or predetermined pressure range (for example, above about 1360 bar, between about 2000 bar and about 3500 bar, between about 2000 bar and about 3700 bar, at about 3000 bar, or at about 3500 bar). In one embodiment, one or more of the nozzles 105 are configured to apply the fluid at a predetermined velocity or within a predetermined velocity range (for example, 250 m/min, 500 m/min, about 560 m/min, about 1120 m/min, between about 250 m/min and about 500 m/min, or between about 560 m/min and about 1120 m/min).

Figure 4:
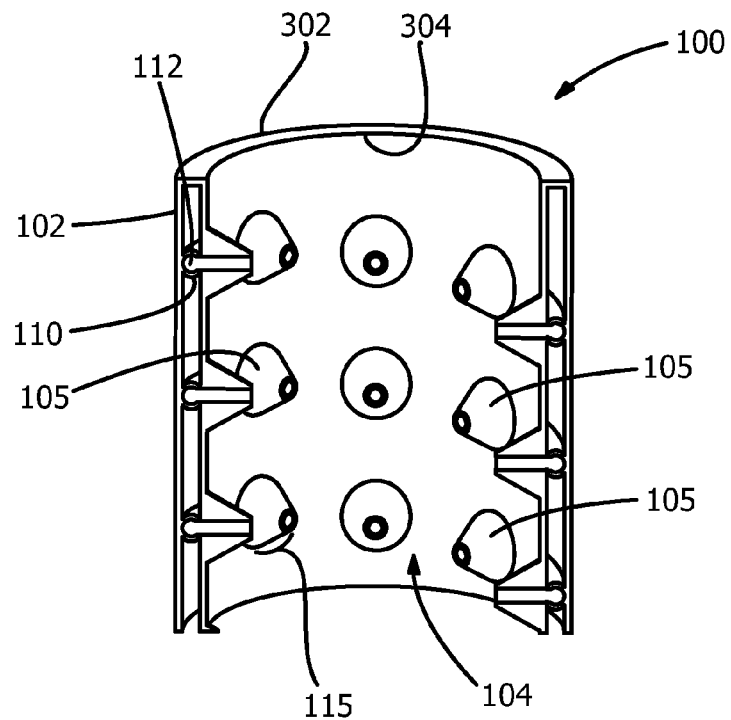
FIG. 4 shows an enlarged sectioned perspective view taken in direction 4-4 in the exemplary surface treatment system of FIG. 1.
Figure 5:
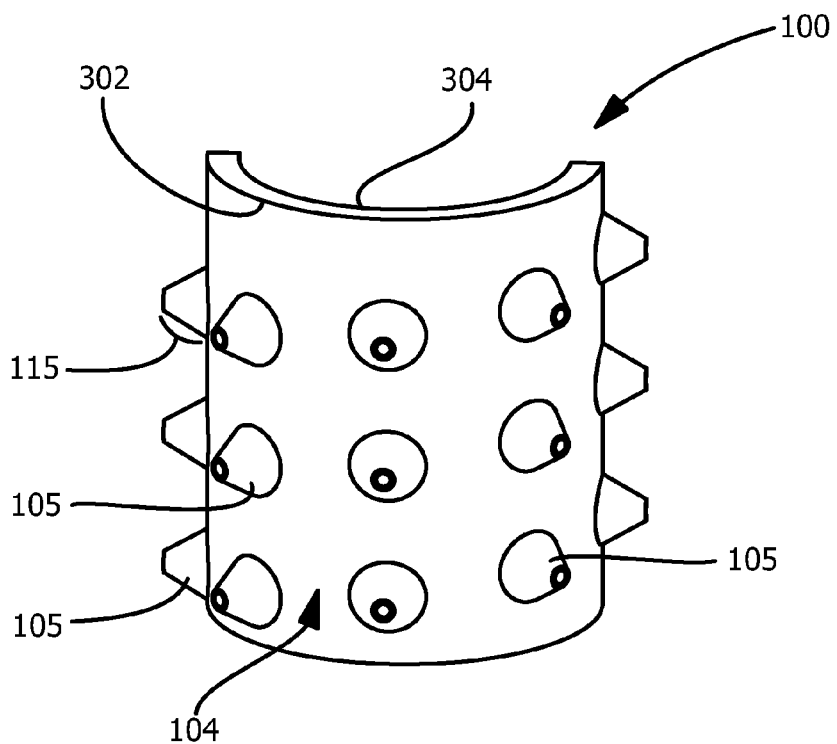
FIG. 5 shows an enlarged sectioned perspective view taken in direction 5-5 in the exemplary surface treatment system of FIG. 2.

In one embodiment, one or more of the nozzles 105 are positioned at a predetermined distance 109 or within a predetermined distance range from the component 106 (for example, about 0.25 mm, about 0.5 mm, about 2 mm, between about 0.5 mm and about 2 mm, between about 0.25 and about 0.5 mm) and/or at a predetermined distance 111 or within a predetermined distance range from other nozzles 105 (for example, about 0.6 cm, about 7.5 cm, about 15 cm, between about 0.6 cm and about 15 cm, between about 0.6 cm and about 7.5 cm). Referring to FIGS. 4-5, in one embodiment, the nozzles 105 are oriented at a predetermined angle 115 or within a predetermined range of angles (for example, about 75 degrees, about 90 degrees, or between about 75 and 90 degrees).

Figure 3:
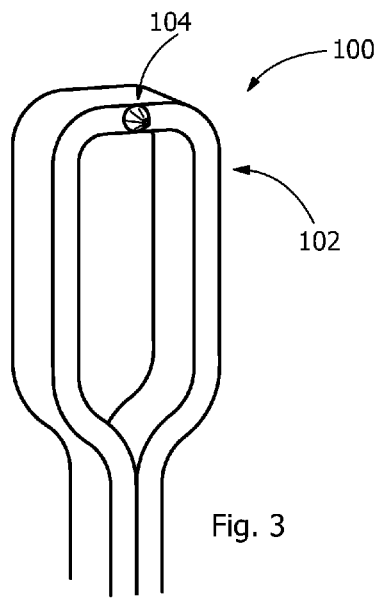
FIG. 3 shows a perspective view of an embodiment of an exemplary surface treatment system according to the disclosure.

Although FIGS. 1-2 show a substantially cylindrical geometry, the system 100 is capable of being any suitable geometry. For example, as shown in FIG. 3, in one embodiment, the system 100 is a substantially planar shape similar to a paddle. In other embodiments, the system 100 is substantially cuboid, substantially linear, shaped corresponding to the metal component 106 (for example, corresponding to the geometry of a compressor blade, a compressor dovetail, or a rotor), or combinations thereof.

The induction heater 102 includes one or more induction coils 110. Referring to FIGS. 1 and 4, in one embodiment, the induction coil 110 is oriented in a substantially helical arrangement within the system 100. In one embodiment, the induction coil 110 is housed within an outer wall 302 (substantially forming an outer cylinder) and an inner wall 304 (substantially forming an inner cylinder). The nozzle arrangement 104 is positioned on or within the outer wall 302 (see FIGS. 2 and 4), the inner wall 304 (see FIGS. 1 and 3), or both. Referring to FIG. 4, in one embodiment, the coil 110 includes a fluid passage 112 to transport the fluid and transfer heat from the induction heater 102 to the fluid, thereby extending the usable life of the induction heater 102. The fluid enters the fluid passage 112 through an inlet (not shown), cools the interior of the coil 110, and exits the fluid passage 112 through an outlet (not shown) during the induction heating mode. In one embodiment, during induction heating mode, the fluid is collected, cooled, and re-circulated through the coil(s) 110. During fluid application mode, a valve (not shown) directs a portion or all of the fluid through the nozzle arrangement 104 to be applied to the component 106. In one embodiment, during fluid application mode, the fluid is collected, purified, and re-circulated.

In one embodiment, the fluid is applied during fluid application mode under supercavitation conditions (for example, the fluid is at a temperature of about the boiling point of the fluid or a temperature corresponding to a cavitation pressure of the fluid). Supercavitation is the use of cavitation effects to create a bubble of gas inside of the fluid, allowing an object suspended in the fluid to travel at extremely high velocities due to the object being fully enclosed by the bubble. The supercavitation reduces drag on the object (for example, by about 1,000 times) allowing the object to be applied to the component 106 at the predetermined velocity range. In one embodiment, the object suspended in the fluid is an abrasive. A suitable fluid is water. A suitable abrasive is silicon carbide or ice having, for example, a substantially spherical geometry and/or a predetermined particle size or particle size range (for example, about 80 mesh, about 400 mesh, or between about 80 mesh and about 400 mesh).

Figure 6:
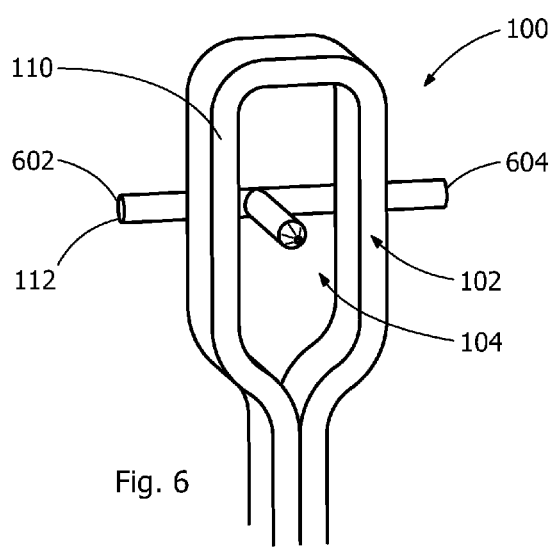
FIG. 6 shows a perspective view of an embodiment of an exemplary surface treatment system according to the disclosure.

In one embodiment, as shown in FIG. 6, the system 100 includes the fluid passage 112 leading to the nozzle arrangement 104, the fluid passage 112 and the nozzle arrangement 104 being proximal to the coil 110, and the fluid passage 112 and the nozzle arrangement 104 being separate from the coil 110. In this embodiment, the coil 110 is not cooled by the fluid and the system 100 is capable of being positioned such that the nozzle arrangement 104 and the coil 110 are proximal to the component 106 or a portion of the component 106. In this embodiment, the fluid enters the fluid passage 112 through an inlet 602, cools the interior of the coil 110, and exits the fluid passage 112 through an outlet 604 during the induction heating mode. During fluid application mode, the fluid enters the fluid passage 112 through the inlet 602 and is applied to the component 106 through the nozzle arrangement 104. The adjustment between the induction heating mode and the fluid application mode is achieved by any suitable mechanism including, but not limited to, a flow control mechanism such as a valve.

Figure 7:
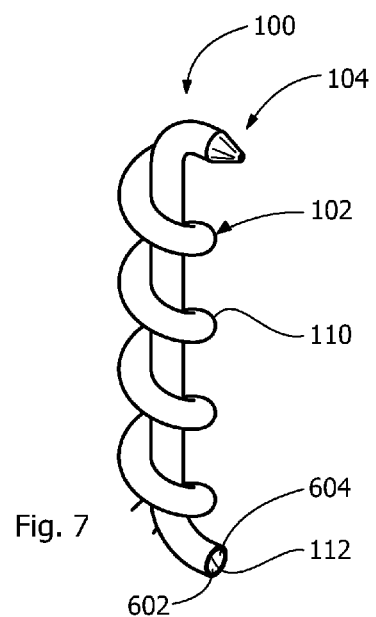
FIG. 7 shows a perspective view of an embodiment of an exemplary surface treatment system according to the disclosure.

In another embodiment, as shown in FIG. 7, the system includes the coil 110 being wrapped around the fluid passage 112 that leads to the nozzle arrangement 104. In this embodiment, the coil 110 is cooled by the fluid passage 112 and the system 100 is capable of being positioned such that the nozzle arrangement 104 and the coil 104 are proximal to the component 106 or a portion of the component 106. In this embodiment, the fluid enters the fluid passage 112 through an inlet 602, cools the interior of the coil 110, and exits the fluid passage 112 through an outlet 604 during the induction heating mode. During fluid application mode, the fluid enters the fluid passage 112 through the inlet 602 and is applied to the component 106 through the nozzle arrangement 104. The adjustment between the induction heating mode and the fluid application mode is achieved by any suitable mechanism including, but not limited to, adjusting the nozzle arrangement 104 to prevent application of the fluid.

Referring to FIGS. 8-9, in one embodiment, the component 106 is a turbine blade. The surface 116 of the turbine blade is heated by the induction heater 102 described above forming the heated surface. A sub-layer 902 of the component 106 defined by a predetermined depth 114 operates as a transition zone and is heated to a lesser degree by the induction heater 102 than the surface 116. An interior portion 120 of the component 106 is heated to an even lesser degree or is substantially unaffected by the induction heating. Similarly, an untreated portion 904 is heated to a lesser degree or substantially unaffected by the induction heating. In an exemplary process, the component 106 is heated by the induction heater 102 (for example, on the surface 116 of the component 106). The inductive heating forms a compressive residual stress layer (for example, on the surface 116 of the component 106). In one embodiment, the compressive residual stress formed (for example, extending to the predetermined depth 114) is adjusted by increasing or decreasing the AC current frequency, the current density, the coil surface area, a distance between the coil 110 and the component 106, other suitable parameters, or combinations thereof.

AC current travels through the coil(s) 110 at a predetermined frequency and a predetermined current density. In one embodiment, the frequency is decreased and/or the current density is increased to decrease heating (for example, of the predetermined depth 114) in comparison to another portion of the component 106 (for example, the surface 116 of the component 106). In one embodiment, the AC current is adjustable from a first predetermined frequency (for example, about 100 kilohertz) to a second predetermined frequency (for example, about 1 megahertz) and/or the current density is adjustable from a first predetermined current density (for example, about $15 \times 10^6$ amp/m$^2$) to a second current density (for example, about $5 \times 10^6$ amp/m$^2$).

Figure 10:
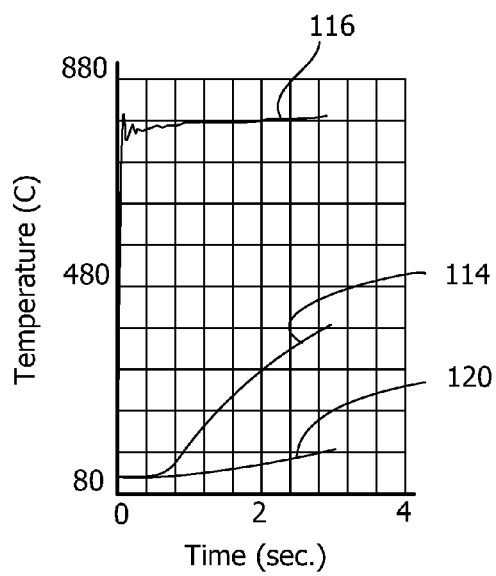
FIGS. 10-12 show plots of temperature over time comparatively illustrating an exemplary surface treatment process according to the disclosure.
Figure 11:
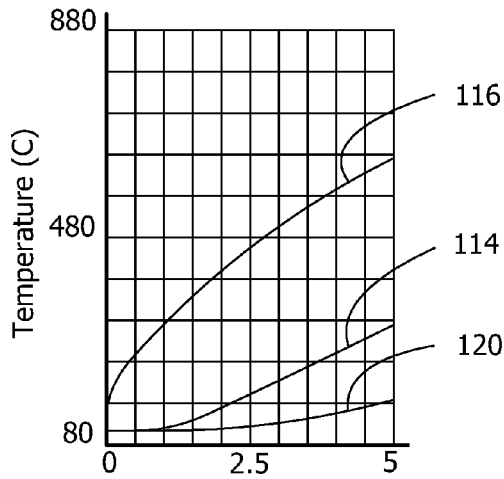
Figure 12:
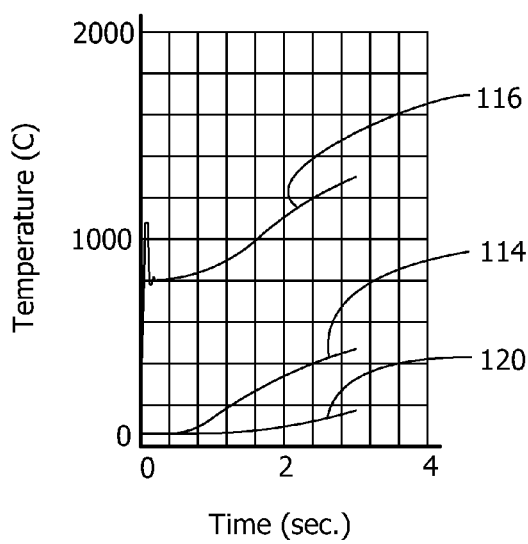

Referring to FIGS. 10 and 11, a increase in the frequency (for example, to 1000 kilohertz as shown in FIG. 10 from 100 kilohertz as shown in FIG. 11) increases temperature at the surface 116. This reduces heating at the predetermined depth 114 and a temperature increase is localized to the surface 116 of the metal component 106 while heating of an interior portion 120 is reduced or eliminated. Referring to FIGS. 10 and 12, an increase in current density (for example, from $5 \times 10^6$ amp/m$^2$ as shown in FIG. 12 to $15 \times 10^6$ amp/m$^2$ as shown in FIG. 10) increases temperature at the surface 116 in a substantially uniform manner. The relationships of these adjustments and/or the other adjustments described below are used for controlling the relative temperature, and thus the compressive residual stress, for the surface 116, the predetermined depth 114, the interior portion 120, other suitable portions of the component 106, and combinations thereof.

Referring again to FIGS. 1-2, in one embodiment, a distance 113 between the metal component 106 and the induction heater 102 (or the coil(s) 110) is adjustable. For example, in one embodiment, the distance 113 between the induction heater 102 (or the coil(s) 110) and the component 106 is increased thereby forming a greater temperature gradient between the surface 116 (see FIG. 9), the predetermined depth 114 (see FIG. 9), the interior portion 120 (see FIG. 9), and combinations thereof, thereby increasing compressive residual stress. In one embodiment, the coil 110 is positionable from a first position having a first predetermined cross-sectional area (for example, about 15 cm$^2$) to a second position having a second predetermined cross-sectional area (for example, about 225 cm$^2$).

While only certain features and embodiments of the invention have been shown and described, many modifications and changes may occur to those skilled in the art (for example, variations in sizes, dimensions, structures, shapes and proportions of the various elements, values of parameters (for example, temperatures, pressures, etc.), mounting arrangements, use of materials, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

What is claimed is:

1. A surface treatment system, comprising:
    an induction heater arranged and disposed to heat a component to form a heated surface while in an induction treatment mode;
    a nozzle arrangement connected to the induction heater and positioned with the induction heater to apply a fluid to the heated surface of the component at a pressure above cavitation conditions of the fluid to form a processed surface while in a fluid application mode; and
    a fluid passageway to transport the fluid;
    wherein the nozzle arrangement includes a plurality of conical nozzles extending from the induction heater, positioned around the processed surface, and in communication with the fluid passageway;
    wherein the fluid includes an abrasive enclosed by a bubble suspended in the fluid;
    wherein the processed surface includes compressive residual stress; and
    wherein the fluid passageway, the induction heater, and the nozzle arrangement are capable of operation under cavitation conditions.

2. The system of claim 1, wherein the induction heater is configured to heat the fluid.

3. The system of claim 1, wherein the induction heater includes more than one induction coil.

4. The system of claim 1, wherein the arrangement of the induction heater forms a chamber, the chamber configured for the component to be positioned within the chamber.

5. The system of claim 4, wherein the chamber is substantially cylindrical.

6. The system of claim 4, wherein the nozzle arrangement is coaxially positioned within the chamber.

7. The system of claim 1, wherein the nozzle arrangement is unitary with the induction heater.

8. The system of claim 1, wherein the nozzle arrangement is configured to transport the fluid through the induction heater.

9. The system of claim 1, wherein the induction heater includes adjustable parameters selected from the group consisting of AC current, current density, a distance between the component and the induction heater, a surface area of the induction heater, and combinations thereof.

10. The system of claim 1, wherein the nozzle arrangement includes adjustable parameters selected from the group consisting of fluid pressure, fluid velocity, a distance between the component and the nozzle arrangement, a distance between a first nozzle and a second nozzle in the nozzle arrangement, an angle of the first nozzle, and combinations thereof.

11. The system of claim 1, wherein the abrasive is selected from the group consisting of silicon carbide, ice, and combinations thereof.

12. The system of claim 1, wherein the induction heater includes the fluid passageway, and a valve directs at least a portion of the fluid through the nozzle arrangement while in a fluid application mode.

13. A surface treatment process, comprising:
    providing a component and a system, the system comprising:
        an induction heater arranged and disposed to heat the component to form a heated surface; and
        a nozzle arrangement connected to the induction heater and positioned with the induction heater to apply a fluid including an abrasive to the heated surface of the component;
    wherein the nozzle arrangement includes a plurality of conical nozzles extending from the induction heater, positioned around the processed surface, and in communication with the fluid passageway;
    inductively heating the component by the induction heater thereby forming the heated surface; and
    applying the fluid including the abrasive by the nozzle arrangement to the heated surface at a pressure above cavitation conditions of the fluid, wherein the abrasive is enclosed by a bubble suspended in the fluid, thereby forming a processed surface;
    wherein the processed surface includes compressive residual stress.

14. The process of claim 13, further comprising heating the fluid with the induction heater to provide a temperature corresponding to the cavitation pressure of the fluid.

15. The process of claim 14, wherein the heating of the fluid with the induction heater occurs by the fluid being transported through a passageway in the induction heater.

16. The process of claim 13, wherein the process increases fretting fatigue resistance of the component.

17. The system of claim 1, wherein an orientation of the induction heater is selected from the group consisting of housed within an outer wall and an inner wall, wrapped around the fluid passageway, in a helical arrangement within the system, and combinations thereof.

18. The system of claim 1, wherein the induction heater and the nozzle form a shape selected from the group consisting of cylindrical, planar, cuboid, linear, corresponding to the metal component, and combinations thereof.

19. The system of claim 1, wherein the cavitation conditions further comprise supercavitation conditions.

* * * * *